United States Patent Office 3,652,652
Patented Mar. 28, 1972

3,652,652
3-METHALLYLLEVULINATES AND
PREPARATION THEREOF
Marc Julia, Paris, France, assignor to Rhone-Poulenc S.A.,
Paris, France
No Drawing. Application July 1, 1966, Ser. No. 574,520,
which is a division of application Ser. No. 329,242,
Dec. 9, 1963. Divided and this application Apr. 22,
1969, Ser. No. 818,399
Claims priority, application France, Dec. 9, 1962,
919,497
Int. Cl. C07c 67/00, 69/66
U.S. Cl. 260—483                              3 Claims

ABSTRACT OF THE DISCLOSURE

The invention provides alkyl 3-methallyllevulinates useful as intermediates in the preparation of chrysanthemic acid and a process for their production by reaction of an alkyl enol ether of an alkyl levulinate with methallyl alcohol and heating.

---

This application is a divisional of my application Ser. No. 574,520 filed July 1, 1966 and now abandoned, itself a divisional of my application Ser. No. 329,242 filed Dec. 9, 1963 and now abandoned.

The present invention relates to the production of chrysanthemic acid.

It is known that some esters of chrysanthemic acid, such as the pyrethrins, the cinerins, the allethrins and the furethrins, constitute a very interesting class of insecticides, because of their high insecticidal activity coupled with their low toxicity to man and warm blooded animals. It is known that chrysanthemic acid has two stereoisomeric forms, cis and trans, and that the esters of the trans acid generally have a higher insecticidal activity than those of cis form.

Hitherto, chrysanthemic acid has been prepared by hydrolysis of rethrins of natural origin or by the synthesis of Staudinger et al. [Helvetica Chimica Acta (1924) 7, p. 390] as developed by Campbell et al. [J. Chem. Soc. (1945) p. 283]. This synthesis, which starts from the reaction of ethyl diazoacetate with 2,5-dimethyl-hexa-2,4-diene and leads to a mixture of the (dl)-cis- and (dl)-trans-chrysanthemic acids, is however fairly delicate because of the instability of ethyl diazoacetate. The danger resulting therefrom makes its industrial application very complicated. A similar synthesis, in which the ethyl diazoacetate is replaced by diazoacetonitrile, leads to pure (dl)-transchrysanthemic acid, but involves even more risks.

In U.S. patent specification No. 3,077,496 there has been described a process for the synthesis of (dl)-trans-chrysanthemic acid in which 4 - methyl-3-isobutenyl-γ-valerolactone is intermediately produced. This lactone is opened by treatment with thionyl chloride, and then reacted with ethanol saturated with hydrochloric acid. It is stated that in this reaction ethyl 5-methyl-3-(1-chloro-isopropyl)hex-4-enoate is obtained, and this ester is cyclised to a chrysanthemic acid ester by the action of a strong base. In practice, however, in the opening of the lactone under the conditions indicated ethyl 3-(1-chloro-isopropyl)-5-methyl-5-chlorohexanoate is also produced, as has been shown by Masanao Matsui and Masaaki Uchiyama (Agr. Biol. Chem., vol. 26, No. 8, pp. 532–534 (1962)). These authors have also shown that, when reacted with sodium t-amoxide in a benzene medium, this dichloro ester gives (dl)-trans-ethyl dihydro-δ-chloro-chrysanthemate, which can then be converted by alcoholic potassium hydroxide into (dl)-trans - 2,2-dimethyl-3-(2-methallyl)cyclopropane carboxylic acid, which can be isomerized into (dl)-trans-chrysanthemic acid by the action of toluene-p-sulphonic acid.

A new process has now been found for the preparation of (dl)-trans-chrysanthemic acid from 4 - methyl-3-(2-methallyl)-γ-valerolactone. This process comprises reacting 4-methyl-3-methallyl-γ-valerolactone with a compound known to be capable of converting a γ-lactone into a γ-halogenoacyl halide, reacting the acyl halide thus obtained with an alkanol, optionally containing a hydrogen halide, cyclising the ester so produced with a strong base in an anhydrous medium, and saponifying the cyclic ester thus obtained with a strong alkali, and acidifying the product to liberate free chrysanthemic acid or its isomer 2,2 - dimethyl - 3-methallyl-cyclopropane carboxylic acid or both, and, when the final product contains the said isomer, heating it with an organic sulphonic acid catalyst to isomerize the said isomer to chrysanthemic acid.

4 - methyl-3-methallyl-γ-valerolactone is a new compound and as such within the scope of the invention. Its preparation is described below.

In the aforesaid process, the lactone is first opened by any halogenating agent known to be capable of opening a γ-lactone to give a γ-halogeno-acyl halide. For this purpose, there may be used, for example, a phosphorus halide, phosgene, a sulphonic acid chloride, or, preferably, thionyl chloride. The derivative thus obtained is then converted into a chloroester by the action of an alkanol, e.g. ethanol, optionally containing a hydrogen halide, more especially hydrogen chloride. Particularly suitable alkanols are those containing 1 to 3 carbon atoms. Depending upon the operating conditions, i.e. upon whether or not any hydrogen halide is evolved during the halogenation, and whether or not a hydrogen halide is present in the alkanol, one or both of the compounds of Formulae II and III is obtained:

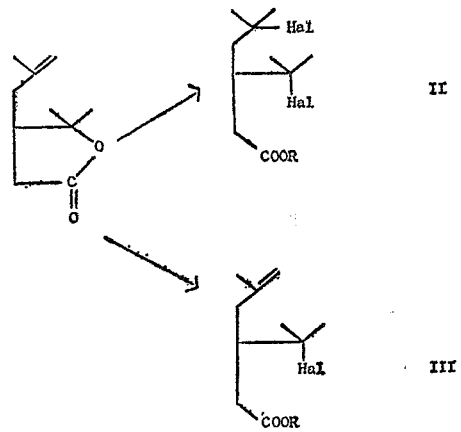

in which Hal represents a halogen atom, preferably chlorine or bromine, and R represents an alkyl radical, ordinarily having from 1 to 3 carbon atoms.

The compounds II and III may be cyclised into cyclopropanecarboxylic esters by the action of a strong anhydrous base. Preferably the base used is an alkali metal hydride, amide or alkoxide, for example sodium or potassium t-butoxide or t-amoxide. Other strong bases such as triphenylmethylsodium, can also be used. The reaction is carried out in organic solvent which is inert under the operating conditions, such as, for example, an aromatic hydrocarbon (e.g. benzene or toluene) or an N,N-disubstituted amide of a lower saturated fatty acid, preferably dimethylformamide or dimethylacetamide, at a temperature between the ambient temperature (about 15° C.) and the boiling temperature of the medium.

When the cyclising agent is an alkali metal hydride or amide, the compound of Formula II gives only, or almost only, an alkyl chrysanthemate, provided at least 2 moles of strong base are used per mole of compound of Formula II. The alkyl chrysanthemate may then be saponified to chrysanthemic acid by the usual saponifying means, preferably by treatment with an alkali metal hydroxide. With the alkali alkoxides (e.g. t-butoxide or t-amoxide), it is also possible to eliminate the 5-halogen atom of the compound of Formula II simultaneously with the cyclisation, but in this case the elimination is less easy and there is generally obtained a mixture of the chrysanthemic acid ester and of esters of the formulae:

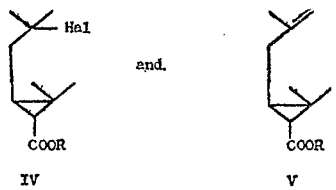

The proportions of these esters in the mixture obviously depend upon the operating conditions, but the proportions are of little importance since, by the usual saponification methods, with, for example, an appropriate quantity of sodium or potassium hydroxide, there is obtained a mixture of chrysanthemic acid and its isomer, 2,2-dimethyl - 3 - methallyl - cyclopropane carboxylic acid, of which the latter is isomerised to the former by heating in the presence of toluene-p-sulphonic acid or other organic sulphonic acid as described by Matsui.

The compound of Formula III gives only the ester of Formula V, regardless of the nature of the anhydrous strong base used for the cyclisation. The acid obtained from this ester can however be isomerised, in the way described above, into chrysanthemic acid.

In practice, therefore, it is unnecessary to separate the products derived from the lactone of Formula I when a mixture is obtained. The cyclisation of the mixture gives a mixture of cyclopropanecarboxylic acid esters, which is saponified to give a mixture of acids, but the latter mixture, on isomerisation by heating in the presence of traces of e.g. toluene-p-sulphonic acid or methanesulphonic acid, gives chrysanthemic acid only.

According to a feature of the invention, 4-methyl-3-methallyl-γ-valerolactone is prepared by reacting an allyl 3-methallyllevulinate with a methyl magnesium halide in an anhydrous medium and hydrolysing the product. Alkyl 3-methallyllevulinates, whose preparation is described below, are new compounds and as such within the scope of the invention.

The process may be represented as follows:

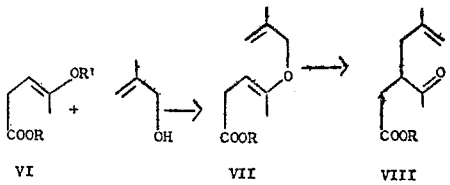

In these formulae, R and R' represent alkyl radicals generally having from 1 to 3 carbon atoms. In practice, a levulinic derivitive of Formula VI is used in which R' is identical to R, for example, the ethyl enol ether of ethyl levulinate obtained by the method of R. G. Jones, (J. Amer. Chem. Soc. (1955), p. 4069). The transetherification with methallyl alcohol is carried out at ambient temperature, and the allyl ether is then transposed into alkyl 3-methallyllevulinate of Formula VIII by heating. The transformation of the alkyl 3-methallyllevulinate into 4 - methyl - 3 - methallyl - γ - valerolactone is effected by reaction with a methyl magnesium halide, and hydrolysis of the intermediate product in the conventional manner.

The following examples illustrate the invention.

EXAMPLE 1

10 g. of 4 - methyl - 3 - methallyl - γ - valerolactone, prepared as described below, are dissolved in 60 cc. of anhydrous benzene and the mixture is refluxed for 4½ hours with 15 cc. of thionyl chloride. After cooling, there are added 60 cc. of ethanol saturated with hydrogen chloride and the mixture is left overnight at a temperature of about 20° C. The solvent is then evaporated in vacuo and the residue distilled. There are thus obtained 12.7 g. (78% yield) of a product, B.P.$_{0.1\text{ mm.}}$=95–100° C., the infra-red spectrum of which does not exhibit the band characteristic of double bonds, and which is identified as ethyl 5-methyl-5-chloro-3-(1-chloroisopropyl)hexanoate.

11.5 g. (0.042 mole) of this dichloroester are treated with 2.3 g. of sodium hydride (0.095 mole) in 120 cc. of dimethylformamide at 60° C. until the evolution of gas (3½ hours). After dissolution in water (500 cc.), the product is extracted with ether (3× 100 cc.) and the ethereal solution is then washed with water and dried over sodium sulphate. After evaporation, the ethereal solution gives 5.5 g. of a product distilling at 72° C. under a pressure of 0.3 mm. Hg, which has the infra-red spectrum characteristic of ethyl chrysanthemate. On saponification with a mixture of potassium hydroxide and methanol, followed by acidification with hydrochloric acid, there are obtained 4.3 g. of chrysanthemic acid, M.P. 47–48° C.

From the aqueous fraction obtained after cyclisation and extraction with ether, 0.5 g. of chrysanthemic acid is recovered by acidification and extraction with ether. There is thus obtained a total yield of 4.8 g. (67% of theory based on the dichloroester).

The lactone starting material is prepared as follows:

(1) 15 g. of methallyl alcohol (0.21 m.) and 39 g. of the ethyl enol ether of ethyl levulinate (0.226 m.) are dissolved in 10 cc. of petroleum ether (B.P.=100–120° C.) and a few milligrammes of toluene-p-sulphonic acid are added. The mixture is heated under reflux for 16 hours. After cooling, the organic phase is washed with aqueous sodium bicarbonate solution and then with water and dried over sodium sulphate. The solvent is driven off and the residue is distilled. There is obtained a first fraction (7 g.), B.P. $_{0.3\text{ mm.}}$=55–75° C., and then at from 75° to 77° C. under 0.3 mm. Hg, there are obtained 32 g. of a product consisting almost exclusively of ethyl 3-methallyllevulinate.

(2) A methylmagnesium iodide solution (0.33 mole) is prepared from 8 g. of magnesium, 50 g. of methyl iodide and 200 cc. of anhydrous ether. After completion of the reaction, the magnesium compound is added to 62 g. (0.31 mole) of ethyl 3-methallyllevulinate in solution in 100 cc. of anhydrous ether, the temperature being maintained between −2° and −4° C. When the addition is complete, the product is allowed to return over 1 hour to ambient temperature and is then hydrolysed with a saturated solution of ammonium chloride. The organic layer is decanted and the mother liquors are carefully extracted with ether. The combined extracts are washed with a saturated solution of sodium chloride and then dried over sodium sulphate. After evaporation of the solvent, distillation gives 45 g. of crude 4-methyl-3-methallyl-γ-valerolactone, B.P. $_{0.2\text{ mm.}}$=77–80° C.; $n_D^{20}$=1.4578.

In order to eliminate the traces of keto-ester revealed by the infra-red spectrum, the product is dissolved in 200 cc. of ether and stirred for 2 hours with 250 cc. of 2 N sodium hydroxide solution. After acidification and extraction with ether, the lactone is recovered and, on redistillation, gives 38 g. of pure product, B.P. $_{0.2\text{ mm.}}$=77–78° C.; $n_D^{20}$=1.4613; yield=72%.

EXAMPLE 2

12.7 g. of ethyl 5-methyl-5-chloro-3-(1-chloroisopropyl)-hexanoate, prepared as described in Example 1, are dissolved in 60 cc. of anhydrous benzene. 120 cc. of a benzene solution of sodium t-amoxide (1.6 M.) are added, and the mixture is heated under reflux for 3 hours and then allowed to stand overnight at room temperature.

After dilution with water (250 cc.), the mixture is extracted with ether (2× 100 cc.), and the extracts are washed with N sodium hydroxide, water, and 2 N sulphuric acid, and dried over sodium sulphate. Distillation gives 7.2 g. of product, B.P. $_{0.3\text{ mm.}}$=85–90° C., which is saponified with 10 g. of potassium hydroxide in 50 cc. of ethanol by refluxing for 4 hours. After acidification, extraction and distillation, there are obtained 4 g. of crude oily acid. This is dissolved is 30 cc. of xylene, 10 mg. of toluene-p-sulphonic acid are added, and the mixture is refluxed for 1 hour. After distillation of the xylene, the residue is distilled, and 3.5 g. of chrysanthemic acid, which solidifies on cooling, are recovered.

I claim:
1. An alkyl 3-methallyllevulinate in which the said alkyl is of 1 to 3 carbon atoms.
2. Ethyl 3-methallyllevulinate.
3. Process for the production of an alkyl 3-methallyllevulinate which comprises reacting an alkyl enol ether of an alkyl levulinate with methallyl alcohol and heating the reaction mixture, each of the said alkyls being of 1 to 3 carbon atoms.

References Cited
UNITED STATES PATENTS 3,077,496   2/1963   Julia _____ 260—514

OTHER REFERENCES

Julia et al.: Compt. Rend., 251, 1960 (249–251).
Chemical Abstracts, 66: 55316a.
Chemical Abstracts, 66: 65442c.

LORRAINE A. WEINBERGER, Primary Examiner
V. GARNER, Assistant Examiner

U.S. Cl. X.R.

260—343.6, 468 P, 484 R, 486 D, 486 H, 487, 514 P